Figure 3:
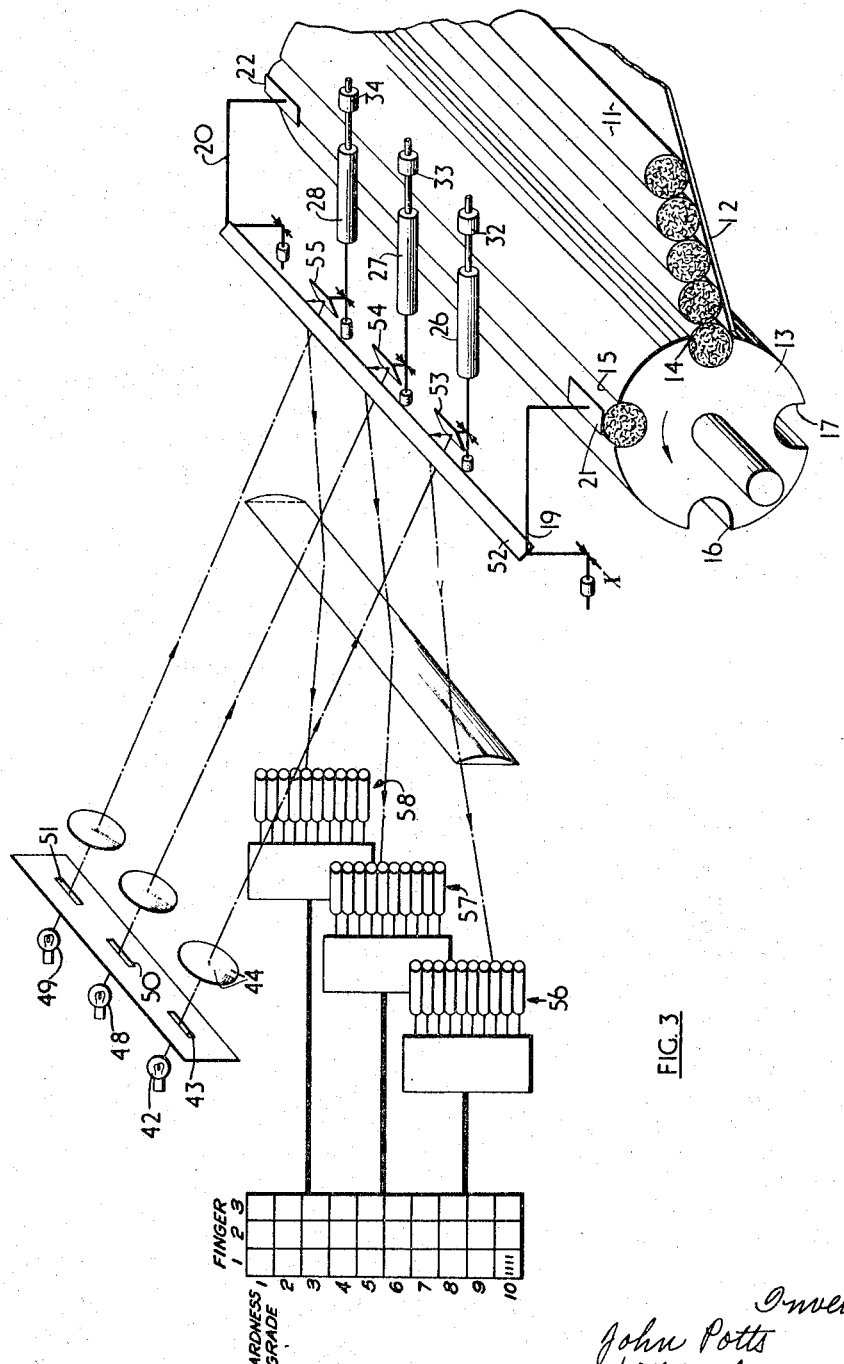

March 21, 1967 J. POTTS ETAL 3,310,682
HARDNESS MEASURER USING TILTABLE MIRRORS
Filed May 20, 1963 2 Sheets-Sheet 1
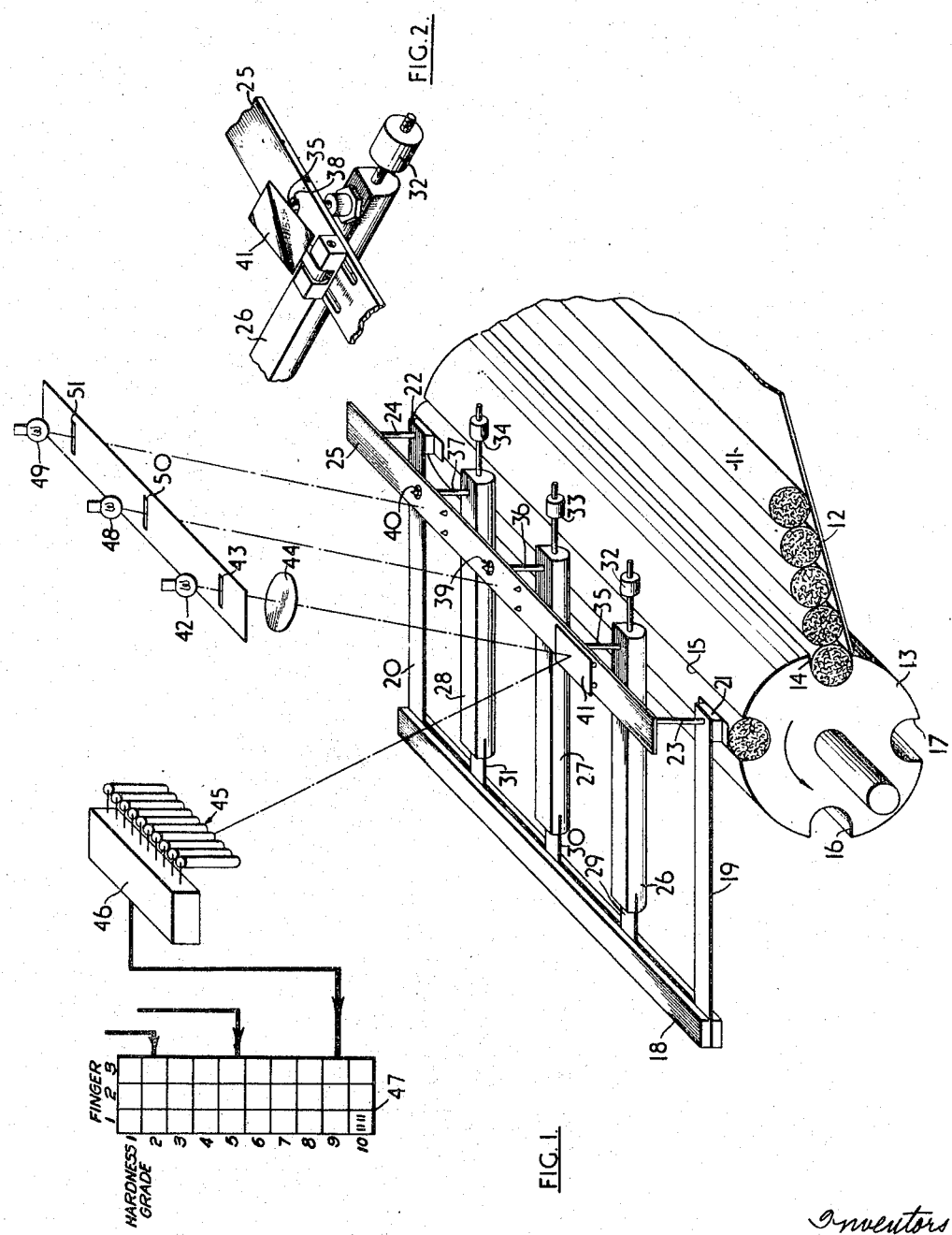
Inventors
John Potts
William James Henry
By Cushman, Darby & Cushman
Attorneys March 21, 1967 J. POTTS ETAL 3,310,682
HARDNESS MEASURER USING TILTABLE MIRRORS
Filed May 20, 1963 2 Sheets-Sheet 2

Inventors
John Potts
William James Henry
By Cushman, Darby & Cushman
Attorneys

United States Patent Office 3,310,682
Patented Mar. 21, 1967

3,310,682
HARDNESS MEASURER USING TILTABLE MIRRORS
John Potts, Belfast, Northern Ireland, and William J. Henry, Elizabeth, South Australia, Australia, assignors to Short Brothers & Harland Limited and Gallaher Limited, both of Belfast, Northern Ireland
Filed May 20, 1963, Ser. No. 281,451
Claims priority, application Great Britain, May 21, 1962, 19,556/62
12 Claims. (Cl. 250—230)

The present invention relates to apparatus for measuring the hardness of articles and is particularly though not exclusively concerned with the measurement of the hardness of cigarettes selected as samples during the continuous manufacture thereof.

It is well known that it is highly desirable to provide a cigarette which withstands considerable pressure applied to it when it is held in the hand. This property of hardness depends not only on the quantity of tobacco but also on the type of leaf used, the way it is sliced and the way the tobacco strands are laid in the cigarette. Recently considerable attention has been directed to this advantageous property especially in advertising claims made by manufacturers.

Any claims to improvements in the hardness property of the cigarettes must, however, be supported by accurate tests made on samples of the cigarettes produced, and by the monitoring of their hardness during production. It is accordingly the principal object of the present invention to provide improved apparatus for the measurement of cigarette hardness.

According to the present invention there is provided hardness testing apparatus including a light responsive device adapted to provide a measurement of the angle of inclination of a light beam directed thereto from a reflecting or refracting surface or surfaces so mounted as to provide by the change in angle of inclination of the reflected or refracted beam a measure of the differential change in the angular positions of two deflectable members one of which is arranged to take up an angular position representative of the undistorted size of a part of the article under test and the other of which is arranged to take up an angular position representative of the distorted size of the article when subjected to predetermined loading.

Two embodiments of the invention will now be described by way of example with reference to the accompanying drawings in which, FIG. 1 is a schematic diagram of hardness testing apparatus according to a first embodiment of the invention, FIG. 2 is a schematic perspective view of one of the measuring stations of the apparatus shown in FIG. 1, and FIG. 3 is a schematic diagram of hardness testing apparatus according to a further embodiment of the invention.

Referring first to FIG. 1, samples of cigarettes 11 from a suitable hopper (not shown) are arranged to slide down an inclined plate 12 with their longitudinal axes at right angles to the direction of movement. A feed roller 13 is arranged at the end of the plate 12 with its horizontal rotary axis at right angles to the direction of movement of the cigarettes. The feed roller is provided with four axially-directed longitudinal slots 14, 15, 16 and 17 equiangularly spaced around the roller. Each of the slots 14 to 17 is of semi-cylindrical cross-section and has a diameter slightly in excess of that of the cigarettes, and a Geneva mechanism (not shown) is provided for rotating the roller 13 in step-by-step fashion at a predetermined rate so that the cigarettes from the plate 12 are in turn picked up in the slots 14 to 17 of the roller and transported therein to a measuring station located above the axis of the roller 13.

A fixed frame 18 extending parallel to the rotary axis of the roller 13 is provided at each end with two horizontally directed flexible fingers 19 and 20 the ends of which are provided with shoes 21 and 22 arranged to rest on opposite ends of a cigarette on its arrival at the measuring station. The ends of the two fingers 19 and 20 are provided with upstanding pins 23 and 24 which support a horizontal beam 25 arranged directly above and parallel to the cigarette at the measuring station. At three spaced intermediate positions along the fixed frame 18 there are provided three further deflectable fingers 26, 27 and 28, hereinafter referred to as the intermediate fingers, which extend horizontally from the frame 18 and are arranged to bear down upon the cigarette at three intermediate positions therealong. The three intermediate fingers 26, 27 and 28 are attached to the frame 18 by flexible strips 29, 30 and 31 and are weighted by adjustable weights 32, 33 and 34 to provide an appropriate downward force on the cigarette of, say, 100 grams at each position. The ends of the intermediate fingers 26 to 28 are provided with upstanding pins 35, 36 and 37 arranged to pass through registering holes 38, 39 and 40 in the overhead beam 25 and to support the free ends of light-reflecting plates the first only of which is shown in FIG. 1 as indicated by the reference numeral 41. As will be seen from FIG. 1, the light-reflecting plate 41 is mounted at its other end for pivotal movement in relation to the beam 25 about an axis at right angles to the longitudinal axis of the cigarette under test.

Light is directed on to the reflecting plate 41 from a remote light source in the form of a lamp 42 arranged to provide light through a light slit 43 extending in a direction parallel to the pivotal axis of the reflecting plate 41, and a lens system 44 for collimating the light from a slit 43. A bank 45 of photo-transistor cells is arranged to receive reflected light from the reflecting plate 41, the bank comprising 10 cells arranged in a line parallel to the rotary axis of the feed roller 13. The output signals from the cells of the bank 45 are applied to transistor amplifier circuits 46 in which they are amplified and from which they are fed to operate a group of 10 counters forming the first column of a counter unit 47.

Light is similarly directed on to the other two reflecting plates (not shown) from light sources constituted by lamps 48 and 49, slits 50 and 51 and lens systems (not shown). Two further banks of photo-transistor cells are arranged to receive light from the further two plates, and amplified signals are applied to operate the second and third columns of counters in the unit 47.

In operation, the feed roller 13 operates to bring a cigarette to the measuring station where it is engaged by the two end fingers 19 and 20 and the intermediate weighted fingers 26, 27 and 28 of the measuring apparatus. It remains in this position for about 4 to 5 seconds during which time the intermediate weighted fingers 26 to 28 compress the cigarette and as a result move angularly about their hinge lines, whilst the end fingers, which together with all parts supported on them are made as light as possible, rest on the relatively undistorted end portions of the cigarette. The angular lowering movement of each weighted finger provides a measurement of the degree of hardness of the cigarette at the point at which it is loaded, and this angular lowering movement is transmitted to the reflecting plate carried by the beam 25 supported by the end fingers 19 and 20. The pivoting movement of, say, the reflecting plate 41 resulting from the movement of the weighted finger 26 produces an angular displacement of the light beam reflected from the plate 41 and the light beam is caused to traverse the bank 45 of photo-transistor cells. After the preset time of 4 to 5 seconds, the deflection of the weighted finger 26 reaches a substantially constant value and the cell which is exposed to the light beam after this time produces an output which is applied to operate the appropriate counter. At this stage the supply to the counters is applied and the appropriate counter operates.

Any change in the overall diameter of the cigarettes to be tested produces a deflection of all fingers about their pivot axes and a corresponding angular movement of the beam 25 supporting the reflecting plates. Such movement however causes the reflected light beam directed to the photo-transistor cells to be moved in a plane at right angles to the line of cells and hence has no effect on the count.

To avoid multiple counts, each counter as it operates inhibits the operation of the counter corresponding to the next lower degree of cigarette compression. The width of the light beam determined by the length of the light slit is such that the appropriate cell is illuminated by the beam over a sufficiently wide range of cigarette diameter.

There are various adjustments which can be made on the apparatus to adapt it to different types of test which may be required. Firstly, the operating speed may be changed by varying the speed of the motor for the feed roller or by gear changing. With cigarettes which have been tested, the compression time which must be allowed is of the order of 4 or 5 seconds, and a reasonable maximum speed is therefore about 12 cigarettes per minute. The reading is recorded by operation of a micro-switch after about 80% of the loading cycle. The zero position and sensitivity of the apparatus may be adjusted by screwing in or out the vertical pins on the intermediate weighted fingers and sliding the hinges of the reflecting plates back and forth along the length of the beam which supports them.

FIG. 2 shows a preferred arrangement for mounting the reflecting plate 41 on the beam 25 and providing for the adjustment of the position of the hinge axis of the plate along the length of the beam 25 as well as for the adjustment of the height of the pin 35 and the position of the weight 32.

The hardness range of cigarettes is normally from 80% to 95% (100% corresponding to no distortion under load). In tests on a variety of brands of cigarettes a wide range is required to be measured whereas in tests on one brand a narrow range only may be necessary. To set the apparatus up for the various modes of operation, calibration bars are used. These are steel cylinders of similar dimensions to cigarettes with portions in the middle reduced in diameter eccentrically by turning about an axis parallel to the axis of the cylinders. The appropriate cylinder is fitted in the apparatus, rotated until the weighted finger is on the highest part and then the vertical pin adjusted so that the light falls on the cell indicating maximum hardness. The cylinder is then rotated through 180 degrees and the reflecting plate moved so that light falls on the cell at the other end of the bank.

Once the apparatus is set up correcting, it is necessary only to take the zero readings from the counters and switch on the feed roller motor. The hopper is filled up from time to time throughout the test. On completion of the test plotting of the counts on individual counter registers gives a hardness distribution curve. An additional counter (not shown) records the total number of operations of the apparatus and serves as a check on any malfunctioning of the apparatus.

In an alternative embodiment of the invention shown schematically in FIG. 3, the beam supporting the pivotally mounted reflecting plates is dispensed with and the end fingers 19 and 20, instead, arranged to support an elongate light-reflecting strip 52 extending parallel to the rotary axis of the feed roller 13, and adapted to be angularly turned with the end fingers 19 and 20 about a hinge line X—X parallel to the rotary axis of the roller 13. Individual reflecting plates 53, 54 and 55 are provided for the weighted fingers 26, 27 and 28 and are mounted so as to be angularly turned with the fingers when they lower as a result of compression of the cigarette. Light beams from the three light slit sources are directed on to the individual reflecting plates 53, 54 and 55, from which they are reflected to the elongate reflecting strip 52 and from this strip to the appropriate one of the banks 56, 57 and 58 of photo-transistor cells, the arrangement being such that angular movements of the light beams along the lines of cells represent the differential angular movements between the end fingers 19 and 20 and the intermediate weighted fingers 26, 27 and 28.

In an alternative arrangement according to the invention, the feed roller 13 is provided with longitudinal slots which are of rectangular cross-section.

What we claim as our invention and desire to secure by Letters Patent is:

1. Hardness testing apparatus including light projecting means for projecting a beam of light, a first deflectable member for resiliently engaging a first part of an article to be tested, a second deflectable member for resiliently engaging a second part of said article, means to apply a predetermined load to said second deflectable member to tend to compress said second part of said article, light reflecting surface means for reflecting said projected light beam, means interconnecting said light reflecting surface means and said first and second deflectable members to effect a pivotal movement of the light reflecting surface means in response to a differential change in the angular positions of said deflectable members as a result of compression of said second part of the article by the second deflectable member to cause a deflection in said light beam reflected from the light reflecting surface means, and light responsive means receiving said light beam reflected from said light reflecting surface means for providing a measurement of said deflection of the light beam.

2. Apparatus according to claim 1, wherein said light reflecting surface means comprises a light-reflecting plate, and said interconnecting means includes a hinge permitting said plate to pivot about an axis fixed in relation to said first deflectable member and a part carried by said second deflectable member engaging said plate at a point thereon offset from said pivotal axis of the plate.

3. Apparatus according to claim 1, wherein said light reflecting surface means is constituted by first and second light-reflecting plates, said second light-reflecting plate being positioned to reflect said projected light beam on to said first light-reflecting plate, said first light reflecting plate being positioned to reflect said beam on to said light responsive means, and said interconnecting means causing said first light-reflecting plate to pivot in response to displacements of said first deflectable member and said second light-reflecting plate to pivot in response to displacements of said second deflectable member.

4. Apparatus according to claim 2 for measuring the distortion of a cylindrical article, wherein means are provided for supporting the article in a horizontal disposition, wherein said first deflectable member is in the form of an unloaded finger fixed at one end and capable of angular displacement about said fixed end so as to bear down lightly at its other end on said first part of the cylindrical article and wherein said second deflectable member is in the form of a weighted finger fixed at one end and capable of angular displacement about the fixed end thereof so as to bear down on said second part of the cylindrical article under a predetermined loading, and wherein the light-reflecting plate is arranged for pivotal movement about an axis at right angles to the turning axes of the two deflectable members.

5. Apparatus according to claim 4 for testing the hardness of cigarettes, comprising a feed roller mounted for rotation about a horizontal axis and provided with longitudinal slots in the periphery thereof arranged to receive cigarettes from a supply and to bring each cigarette in turn to an uppermost test position where the cigarette is engaged by the ends of the fingers.

6. Apparatus according to claim 5, wherein the unloaded finger is arranged to rest on one end of the cigarette, wherein the apparatus in addition comprises a second unloaded finger of the same form as the first unloaded finger and adapted to bear down lightly on the other end of the cigarette, and a horizontal beam extending parallel to and above the cigarette at the test position, said beam being supported by the ends of the two unloaded fingers and carrying the reflecting plate which is pivotally mounted thereon, and wherein said part carried by said second deflectable member comprises a pin on the loaded finger, which extends upwardly from said loaded finger and passes through the beam to effect pivoting of the reflecting plate.

7. Apparatus according to claim 6, comprising two further weighted fingers of the same form as the first weighted finger and arranged in the same manner at spaced positions along the cigarette for cooperation with further light-reflecting plates mounted on the horizontal beam and arranged to direct beams of light to two further light responsive means.

8. Apparatus according to claim 2 wherein the light responsive means comprises a plurality of photo-transistor cells arranged in a horizontal line at right angles to the pivotal axis of the reflecting plate.

9. Apparatus according to claim 3 for measuring the distortion of a cylindrical article, wherein means are provided for supporting the article in a horizontal disposition, wherein said first deflectable member is in the form of an unloaded finger fixed at one end and capable of angular displacement about said fixed end so as to bear down lightly at its other end on said first part of the cylindrical article, wherein the said second deflectable member is in the form of a weighted finger fixed at one end and capable of angular displacement about the fixed end so as to bear down on said second part of the cylindrical article under predetermined loading, and wherein the light-reflecting plates are fixedly mounted on the fingers so as to be angularly turned when the fingers are subjected to angular displacements.

10. Apparatus according to claim 9 for testing the hardness of cigarettes, comprising a feed roller mounted for rotation about a horizontal axis and provided with longitudinal slots in the periphery thereof arranged to receive cigarettes from a supply and to bring each cigarette in turn to an uppermost test position where the cigarette is engaged by the ends of the fingers.

11. Apparatus according to claim 10, wherein the unloaded finger is arranged to rest on one end of the cigarette, and wherein the apparatus in addition comprises a second unloaded finger of the same form as the first unloaded finger and adapted to bear down lightly on the other end of the cigarette, and a horizontally arranged reflecting strip extending parallel to the cigarette at the test position, said strip being supported by the ends of the two unloaded fingers.

12. Apparatus according to claim 11, comprising two further weighted fingers of the same form as the first weighted finger and arranged in the same manner at spaced positions along the cigarette, each further weighted finger having a reflecting plate mounted thereon for cooperation with the reflecting strip in the directing of beams of light to two further light responsive devices.

References Cited by the Examiner

UNITED STATES PATENTS 2,042,257   5/1936   Harrison et al. ____ 250—231 X
2,504,505   4/1950   De Tar _____ 250—231 X RALPH G. NILSON, Primary Examiner.

E. STRICKLAND, M. ABRAMSON, Examiners.